(12) United States Patent
Søe-Jensen

(10) Patent No.: US 9,759,036 B2
(45) Date of Patent: Sep. 12, 2017

(54) SEALING DEVICE FOR A TUBING ARRANGEMENT

(75) Inventor: Anders Søe-Jensen, Farum (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 569 days.

(21) Appl. No.: 12/665,856

(22) PCT Filed: Jun. 25, 2007

(86) PCT No.: PCT/EP2007/056322
§ 371 (c)(1),
(2), (4) Date: Jun. 9, 2010

(87) PCT Pub. No.: WO2009/000322
PCT Pub. Date: Dec. 31, 2008

(65) Prior Publication Data
US 2010/0264605 A1    Oct. 21, 2010

(51) Int. Cl.
*E02B 17/00*    (2006.01)
*E21B 33/134*   (2006.01)
(Continued)

(52) U.S. Cl.
CPC ........ *E21B 33/134* (2013.01); *E02B 17/0013* (2013.01); *F03D 80/00* (2016.05);
(Continued)

(58) Field of Classification Search
USPC ......... 277/331, 333; 166/179, 118, 120, 122
See application file for complete search history.

(56) References Cited

U.S. PATENT DOCUMENTS 666,541 A * 1/1901 Moser .......................... 277/331
2,306,160 A  12/1942 Freyssinet
(Continued)

OTHER PUBLICATIONS

Yolaine Cussac; International Preliminary Report on Patentability and Written Opinion issued in PCT application No. PCT/EP2007/056322; dated Jan. 5, 2010; 7 pages; The International Bureau of WIPO.

*Primary Examiner* — Eugene G Byrd
(74) *Attorney, Agent, or Firm* — Wood Herron & Evans LLP

(57) ABSTRACT

A sealing device for a tubing arrangement, preferably for use in an offshore facility, such as an offshore wind turbine or an oil rig. The tubing arrangement has a cable or an inner tube arranged in an interior part thereof. The sealing device comprises a substantially rigid housing and a flexible plug part arranged in an interior part of the housing. The housing is mountable on or forms part of the tubing arrangement in such a manner that the interior part of the housing communicates with the interior part of the tubing arrangement. The flexible plug part comprises an inlet opening connectable to a grout source. When grout material is supplied to the flexible plug part, the flexible plug part expands, thereby providing sealing between the housing and a cable or inner tube arranged in the interior of the tubing arrangement. The sealing device can be mounted on the tubing arrangement before the tubing arrangement is mounted on an offshore facility, and the grout material can be supplied at a later time. Use of divers is thereby minimized. The sealing device can easily be removed and replaced.

14 Claims, 3 Drawing Sheets

(51) Int. Cl.
  *F16L 17/10* (2006.01)
  *F03D 80/00* (2016.01)
(52) U.S. Cl.
  CPC ........... *F16L 17/10* (2013.01); *F05B 2240/57* (2013.01); *F05B 2240/95* (2013.01); *Y02E 10/72* (2013.01); *Y10T 29/4998* (2015.01)

(56) References Cited

U.S. PATENT DOCUMENTS

| | | | |
|---|---|---|---|
| 2,922,664 A | 1/1960 | Risley et al. | |
| 3,121,570 A * | 2/1964 | Gilbert | 277/583 |
| 3,337,222 A * | 8/1967 | Smith et al. | 277/350 |
| 3,468,132 A * | 9/1969 | Harris | 405/211 |
| 3,514,115 A * | 5/1970 | Gallo | 376/206 |
| 3,578,083 A * | 5/1971 | Anderson et al. | 166/285 |
| 3,702,537 A * | 11/1972 | Landers | 405/227 |
| 3,782,738 A * | 1/1974 | Ohira et al. | 277/646 |
| 3,967,456 A * | 7/1976 | Stone | 405/225 |
| 4,047,391 A * | 9/1977 | Mayfield et al. | 405/225 |
| 4,063,427 A | 12/1977 | Hoffman | |
| 4,077,224 A * | 3/1978 | Coone | 405/225 |
| 4,155,404 A * | 5/1979 | Hollingsworth | 166/285 |
| 4,171,923 A * | 10/1979 | Landers | 405/225 |
| 4,679,800 A | 7/1987 | Burton | |
| 4,913,232 A * | 4/1990 | Cheymol et al. | 166/285 |
| 4,968,184 A * | 11/1990 | Reid | 405/225 |
| 5,765,834 A | 6/1998 | Engli | |
| 6,003,873 A | 12/1999 | Solberg | |
| 6,009,951 A * | 1/2000 | Coronado et al. | 166/387 |
| 6,050,336 A * | 4/2000 | Willauer et al. | 166/286 |
| 6,575,251 B2 * | 6/2003 | Watson et al. | 166/387 |
| 6,601,852 B1 * | 8/2003 | Kogler et al. | 277/314 |
| 6,698,976 B1 * | 3/2004 | Cho | 405/53 |
| 7,299,882 B2 * | 11/2007 | Brezinski et al. | 166/387 |
| 7,325,621 B2 * | 2/2008 | Naquin et al. | 166/387 |
| 7,481,277 B2 * | 1/2009 | Naquin et al. | 166/387 |
| 7,669,653 B2 * | 3/2010 | Craster et al. | 166/187 |
| 2001/0018977 A1 * | 9/2001 | Kilgore | 166/387 |
| 2001/0045699 A1 | 11/2001 | McKenrick | |
| 2003/0196820 A1 * | 10/2003 | Patel | 166/387 |
| 2005/0199401 A1 * | 9/2005 | Patel et al. | 166/387 |
| 2007/0199693 A1 * | 8/2007 | Kunz | 166/179 |
| 2008/0251250 A1 * | 10/2008 | Brezinski et al. | 166/179 |
| 2010/0018694 A1 * | 1/2010 | Kunz | 166/179 |

* cited by examiner

SEALING DEVICE FOR A TUBING ARRANGEMENT

FIELD OF THE INVENTION

The present invention relates to a device for providing sealing to a tubing arrangement of the kind having a cable or an inner tube arranged in an interior part thereof. The sealing device of the present invention is very suitable for use in offshore facilities, such as offshore wind turbines or oil rigs. More particularly, the present invention relates to a sealing device which can be removed or replaced, e.g. in order to gain access to the tubing arrangement, e.g., with the purpose of performing maintenance on a cable or an inner tube arranged in the interior part of the tubing arrangement or on the tubing arrangement itself.

BACKGROUND OF THE INVENTION

In tubing arrangements for offshore facilities, it is often desirable to be able to prevent sea water from entering the tubing arrangement, or from passing a specific point in the tubing arrangement. In particular, it may be desirable to prevent rush of sea water into such tubing arrangements. Attempts have previously been made to solve this problem.

U.S. Pat. No. 6,003,873 discloses a method and a device for sealing the entrance of an elongated element into the lower end of an offshore tube. A plug-like device is arranged on the element, a predetermined length of the element is pulled into the tube, and the plug is fixed on the element surface at the bellmouth entrance of the tube. The outer diameter of the plug is somewhat smaller than the inner diameter of the tube. Expandable foam is injected to a space between the outer surface of the plug and the inner surface of the tube in order to substantially fill the space.

The sealing device disclosed in U.S. Pat. No. 6,003,873 can only be mounted at a bellmouth of an offshore tube. Thus, it can not be used for providing sealing in any other position along the tube. Furthermore, it is not possible to remove or replace the sealing device, e.g., in case repair or maintenance of the tube is required. Finally, it is necessary to inject the expandable foam immediately after the elongated element (e.g. a cable) is positioned in the tube. This may be difficult to fulfil when the tubing is positioned at an offshore site.

U.S. Pat. No. 5,765,834 discloses a sealing device for sealing off an elongated body, such as a cable, pipe or umbilical, at its entrance to an aperture of an apparatus, such as an offshore J-tube. The sealing device consists of two substantially identical parts or halves which are hinged together along an axis substantially parallel to the axis of the elongated body, each half comprising a centralizer part, a sealing part and tensioning parts. The tensioning parts are capable of pressing the sealing parts into sealing contact against the elongated body, against the inner surface of the J-tube and against the centralizing means. The pressure means may consist of tensioning rods with nuts. By tightening the nuts, the seal is compressed and squeezed between the centralizer and the holding device.

The sealing device of U.S. Pat. No. 5,765,834 is relatively complicated. Furthermore, it is necessary to operate the tensioning part after the elongate element has been positioned in the tube. In the case that the tube is arranged at an offshore facility, this has the consequence that the use of divers is required for this task. This adds considerably to the installation costs. Finally, the sealing device of U.S. Pat. No. 5,765,834 can only be positioned at the entrance opening of the tube, since positioning the sealing device in another position would prevent operation of the tensioning parts.

SUMMARY OF THE INVENTION

It is, thus, an object of the invention to provide a sealing device for a tubing arrangement, the sealing device being adapted to be positioned at various positions of the tubing arrangement.

It is a further object of the invention to provide a sealing device for a tubing arrangement, where the sealing device can be removed or replaced without destruction of the tubing arrangement.

It is an even further object of the invention to provide a sealing device for a tubing arrangement, the sealing device being adapted to be arranged on the tubing arrangement substantially without the aid of divers.

It is an even further object of the invention to provide a method of sealing a tubing arrangement for an offshore facility, where the method can be performed substantially without the aid of divers.

According to a first aspect of the invention the above and other objects are fulfilled by providing a sealing device for a tubing arrangement having a cable or an inner tube arranged in an interior part thereof, the sealing device comprising:
- a substantially rigid housing, said housing being mountable on or forming part of the tubing arrangement in such a manner that an interior part of the housing communicates with the interior part of the tubing arrangement, and
- a flexible plug part arranged in the interior part of the housing, said flexible plug part comprising an inlet opening connectable to a grout source, wherein the flexible plug part is adapted to expand, thereby providing sealing between the housing and a cable or inner tube arranged in the interior part of the tubing arrangement, when grout material is supplied to the flexible plug part via the inlet opening.

In the present context the term 'sealing device' should be interpreted to mean a device which is capable of sealing off the tubing arrangement or part of the tubing arrangement, preferably in such a manner that water is prevented from passing the sealing device.

The tubing arrangement may advantageously be of a kind which is suitable for use in an offshore facility, such as an offshore wind turbine or an oil rig. However, the sealing device of the invention may also be used in other kinds of tubing arrangements for use on shore.

The sealing device comprises a substantially rigid housing. This should be interpreted to mean that one or more outer walls delimit the sealing device, thereby forming a housing. The housing is preferably substantially closed. Furthermore, the walls of the housing are substantially rigid, i.e., they are capable of maintaining their shape, or at least capable of restoring their shape if the shape is changed as a consequence of a force being applied.

The sealing device comprises a flexible plug part arranged in an interior part of the housing. In the present context the term 'flexible' should be interpreted to mean that the plug part comprises one or more walls being capable of changing shape, preferably being expandable. The one or more walls may, for example, be made from a resilient material, such as a rubber material. As an alternative, the flexible plug could be made from another suitable material, such as canvas, a resilient type of plastic material, cloth, etc.

The flexible plug part comprises an inlet opening connected to a grout source. Accordingly, grout material can be supplied to the flexible plug part via the inlet opening. Due to the flexibility of the flexible plug part, supplying grout material in this manner will cause the flexible plug part to expand, or at least adopt the shape of the interior part of the housing. This will be explained further below. The grout material preferably comprises cement and/or concrete. It could, e.g., be a cement/bentonite mixture, such as a mixture made from approximately 50 kg cement, 10 liters of bentonite and 50 liters of water. However, other types of cement, concrete, mortar or mixtures thereof could be used. As an alternative, a curable plastic material may be used. In this case the plastic material should be adapted to cure when positioned under water. Preferably, the grout material is of a kind which cures sufficiently slow to allow the flexible plug part to expand and adopt the shape of the interior parts of the housing and the tubing arrangement, and sufficiently fast to ensure a sealing effect within a reasonable time interval.

The housing is mounted on or forms part of the tubing arrangement in such a manner that an interior part of the housing communicates with the interior part of the tubing arrangement. Thus, at least one passage exists between the interior part of the housing and the interior part of the tubing arrangement. Accordingly, when grout material is supplied to the flexible plug part, and the flexible plug part thereby expands as described above, it is allowed to expand into the interior part of the tubing arrangement. Due to the flexibility of the flexible plug part it will expand in such a manner that it adapts to outer walls of the housing and/or of the tubing arrangement in the vicinity of the flexible plug part, as well as to a cable or an inner tube arranged in the interior part of the tubing arrangement. Thus, when the supplying of grout material to the flexible plug part has been completed, the flexible plug part abuts firmly against such walls and the cable/inner tube, preferably filling out the entire space between outer walls and the cable/inner tube. Accordingly, water can not pass the position of the sealing device inside the tubing arrangement, and a sealing effect is thereby obtained.

The housing may form part of the tubing arrangement. In this case it may simply be a part of the tube where the flexible plug part is arranged. The housing may define an increased cross sectional diameter of the tube. As an alternative, the housing may be a separate part which can be mounted on the tubing arrangement in a detachable or non-detachable manner. In this case, the housing may comprise two flange parts attached to the tubing arrangement and a detachable intermediate part, e.g. formed by two or more subparts, arranged between and attached to the flange parts.

As described above, the sealing effect is obtained in a very easy manner. Furthermore, the sealing device may be positioned at any desired position along the tubing arrangement, i.e., it is not limited to being positioned at an opening. It should be noted, however, that the tubing arrangement must be designed to have the sealing device arranged at a desired position, since the tubing arrangement should be shaped in such a manner that the sealing device fits into the tubing arrangement at the desired position.

A further advantage of the sealing device of the present invention is that the grout source may be positioned in any suitable position, such as above the water level if the tubing arrangement is installed on an offshore facility. Accordingly, the grout material can be supplied, and the sealing effect thereby obtained, without the requirement of divers. It is even possible to mount the sealing device on the tubing arrangement before the tubing arrangement is mounted on the offshore facility, preferably during manufacture of the tubing arrangement on shore. The tubing arrangement, along with the sealing device, is then transported to the site of the offshore facility and mounted thereon. At a later point in time, preferably after a cable or inner tube has been positioned in the interior part of the tubing arrangement, the grout material can be supplied, and the sealing effect thereby obtained. During the procedure described above, use of divers is only necessary to the extent that it is necessary for mounting the tubing arrangement on the offshore facility, i.e., to the extent that it would be necessary if a sealing device was not present. Furthermore, it is not necessary to supply the grout material immediately after the sealing device has been mounted at the offshore site, possibly along with the entire tubing arrangement. Thereby this can be done whenever the weather allows so, and when other circumstances are appropriate.

The housing may comprise at least two detachable housing parts. Thereby, the sealing device can easily be mounted on the tubing arrangement. Furthermore, in the case that it is necessary to perform maintenance on the tubing arrangement or to a cable or inner tube arranged in the interior thereof, including replacement of one or more parts, it is easy to dismantle the sealing device from the tubing arrangement, since it is merely necessary to detach the housing parts from each other and remove the flexible plug part along with the grout material. Thus, the sealing device can, in this case, be dismantled from the tubing arrangement regardless of its position along the tubing arrangement. When the required maintenance has been performed, the sealing device can be replaced by another, substantially identical, sealing device, and the sealing effect is, thus, re-established. It may even be possible to refit the original sealing device. However, this would probably require a replacement of the flexible plug part, since the grout material previously supplied has most likely cured. In order to ensure that the tubing arrangement is not discontinued at the position of the sealing device during a replacement as described above, part of the sealing device may remain on the tubing arrangement. Such a part of the sealing device may, for example, be in the form of one or more stiffening ribs or the like, and/or it may form an integral part of the tubing arrangement. It should, however, be ensured that the flexible plug part of a replacement sealing device is allowed to expand as described previously in order to ensure that a proper sealing effect is obtained.

The housing may comprise exactly two detachable housing parts. Alternatively, it may comprise more than two detachable housing parts, such as three, four, five, six, etc. detachable housing parts. The housing parts may have at least substantially identical size and/or shape, or the size and/or shape of the housing parts may vary.

The flexible plug part may comprise at least one hollow diaphragm, for example, made from a rubber material, such as a natural rubber material, e.g. natural latex rubber, or a synthetic rubber material, e.g., butyl rubber. As mentioned above, canvas, plastic materials or cloth could be used instead of rubber. As an alternative, the flexible plug part may be in the form of at least one bag or the like being able to expand/'inflate' when grout material is supplied as described above. The flexible plug part may comprise exactly one hollow diaphragm, or it may comprise two or more hollow diaphragms. This will be explained further below.

The tubing arrangement may be or comprise a J-tube. A J-tube is a tube having substantially the shape of a 'J', i.e., with a substantially straight part connected to a curved part, preferably arranged near an end of the tube. J-tubes are often used at offshore facilities, such as offshore wind turbines or oil rigs. The tubes may be used for guiding wires, cables or supply tubes to/from the offshore facility. For instance, cables may be used for supplying power to the offshore facility and/or for leading power produced by an offshore wind turbine to a site on shore.

Thus, the tubing arrangement may preferably be adapted to be applied in an offshore facility. However, the tubing arrangement may, alternatively, be applied in a facility positioned on shore.

The flexible plug part may comprise at least two detachable plug portions. The detachable plug portions may advantageously be in the form of hollow diaphragms. According to this embodiment, it is very easy to remove or replace the sealing device, since the plug portions can readily be removed when the housing has been removed, regardless of the position of the sealing device along the tubing arrangement. Furthermore, a new sealing device can easily be mounted on the tubing arrangement. It should be noted that it will normally be necessary to provide a grout connection to each of the plug portions. When grout material is supplied to the plug portions, these will expand in such a manner that sealing is further provided between the plug portions.

The flexible plug part may comprise exactly two detachable plug portions. Alternatively, it may comprise more than two detachable plug portions, such as three, four, five, six, etc. detachable plug portions. The plug portions may have at least substantially identical size and/or shape, or the size and/or shape of the plug portions may vary. Preferably, the housing as well as the flexible plug part is formed by detachable parts, and in this case each of the plug portions may advantageously be sized and shaped in accordance with the size and shape of a corresponding housing part.

According to a second aspect of the invention the above and other objects are fulfilled by providing a tubing arrangement comprising a sealing device according to the first aspect of the invention. As mentioned above, the tubing arrangement may be or comprise a J-tube.

According to a third aspect of the invention the above and other objects are fulfilled by providing a method of sealing a tubing arrangement, the method comprising the steps of:
 providing a sealing device according to the first aspect of the invention,
 mounting the sealing device on the tubing arrangement, and
 supplying grout material to the flexible plug part of the sealing device.

It should be noted that a skilled person would readily recognise that any feature described in combination with the first aspect of the invention could also be combined with the second and third aspects of the invention, any feature described in combination with the second aspect of the invention could also be combined with the first and third aspects of the invention, and any feature described in combination with the third aspect of the invention could also be combined with the first and second aspects of the invention.

As described above, the step of mounting the sealing device on the tubing arrangement is performed in such a manner that it is ensured that an interior part of the housing of the sealing part communicates with an interior part of the tubing arrangement. Thus, when grout material is supplied to the flexible plug part, the flexible plug part expands as described above, thereby providing a sealing effect.

As mentioned above, the step of mounting the sealing device on the tubing arrangement and the step of supplying grout material to the flexible plug part may be temporally spaced apart, thereby providing the possibility of supplying the grout material at a time where weather conditions etc. are favourable, and providing the possibility of mounting the sealing device prior to transporting the tubing arrangement to an offshore site.

The method may further comprise the step of replacing the sealing device by another at least substantially identical sealing device. This may, for example, be desirable in the case that maintenance of the tubing arrangement and/or of a cable or inner tube arranged in the interior part of the tubing arrangement is required. This has already been described above. Alternatively, the sealing device itself may be broken or faulty, a replacement thereby being necessary.

As described above, a substantial time interval may be allowed to lapse between performing the step of mounting the sealing device and performing the step of supplying grout material.

BRIEF DESCRIPTION OF THE DRAWINGS

The invention will now be described in further detail with reference to the accompanying drawings in which.

DETAILED DESCRIPTION OF THE DRAWINGS

Figure 1A:
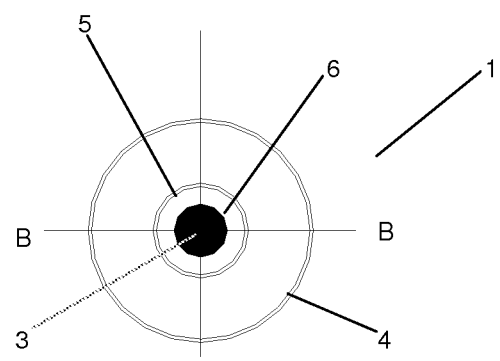
FIGS. 1a and 1b are cross sectional views in two perpendicular directions of a sealing device according to an embodiment of the invention, prior to supplying grout material.
Figure 1B:
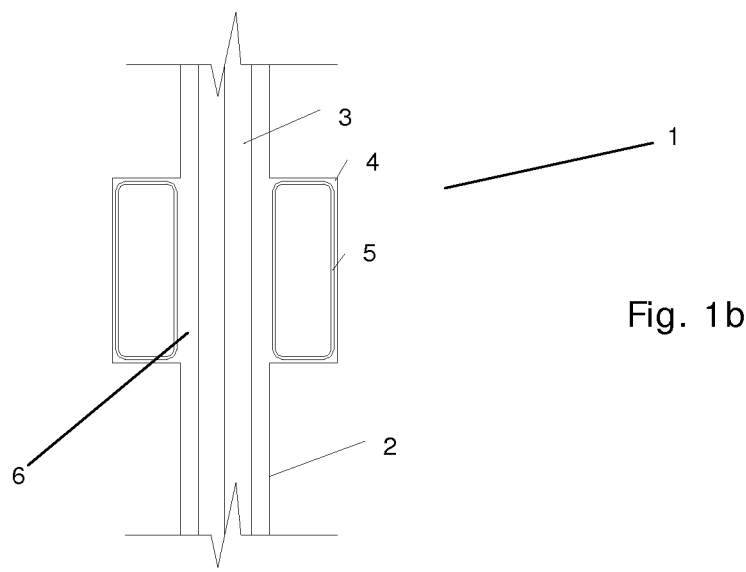

FIGS. 1a and 1b are cross sectional views of a sealing device 1 according to an embodiment of the invention. The sealing device 1 is mounted on a tubing arrangement 2 having a cable 3 arranged in an interior part thereof. In FIG. 1a the cross section is taken in a direction which is substantially perpendicular to a lengthwise direction of the tubing arrangement 2. In FIG. 1b the cross section is along line B-B shown in FIG. 1a.

The sealing device 1 comprises a housing 4 and a flexible plug part 5 arranged in an interior part of the housing 4. It is clear from FIG. 1b that the interior part of the housing 4 communicates with the interior part of the tubing arrangement 2, and that it is therefore possible for the flexible plug part 5 to expand into the interior part of the tubing arrangement 2. This will be explained further below with reference to FIGS. 2a and 2b. In FIGS. 1a and 1b the flexible plug part 5 is empty. Therefore it does not extend beyond the interior part of the housing 4, and a passage 6 is defined between the flexible plug part 5 and the cable 3. This passage 6 allows the cable 3 to move along the lengthwise direction of the tubing arrangement 2. This is, for example, necessary during installation of the cable 3 in the tubing arrangement 2, where the cable 3 is typically pulled through the tubing arrangement 2.

The flexible plug part 5 is connected to a grout source (not shown) via an inlet opening (not shown). When the cable 3 has been properly installed in the interior part of the tubing arrangement 2, grout material can be supplied to the flexible plug part 5 from the grout source, via the inlet opening. The flexible plug part 5 is made from a flexible or resilient material, and supplying grout material in this manner therefore causes the flexible plug part 5 to expand.

Figure 1C:
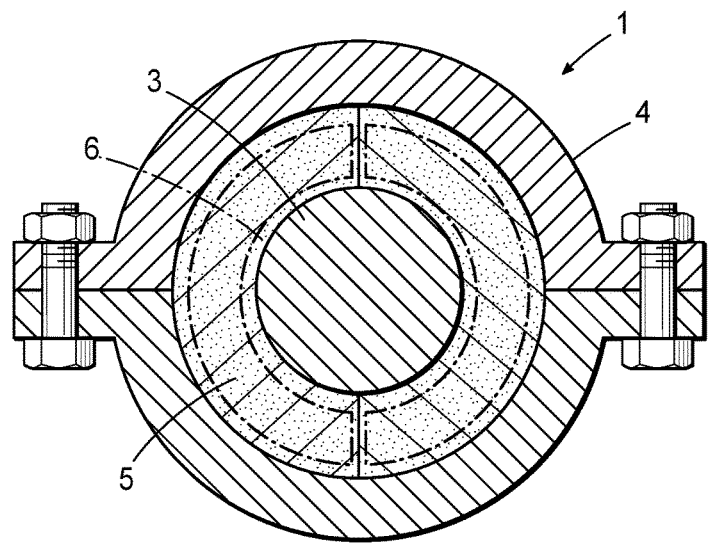
FIGS. 1c and 1d are cross sectional views of a sealing device according to an embodiment of the invention, having detachable housing parts and detachable plug portions.
Figure 1D:
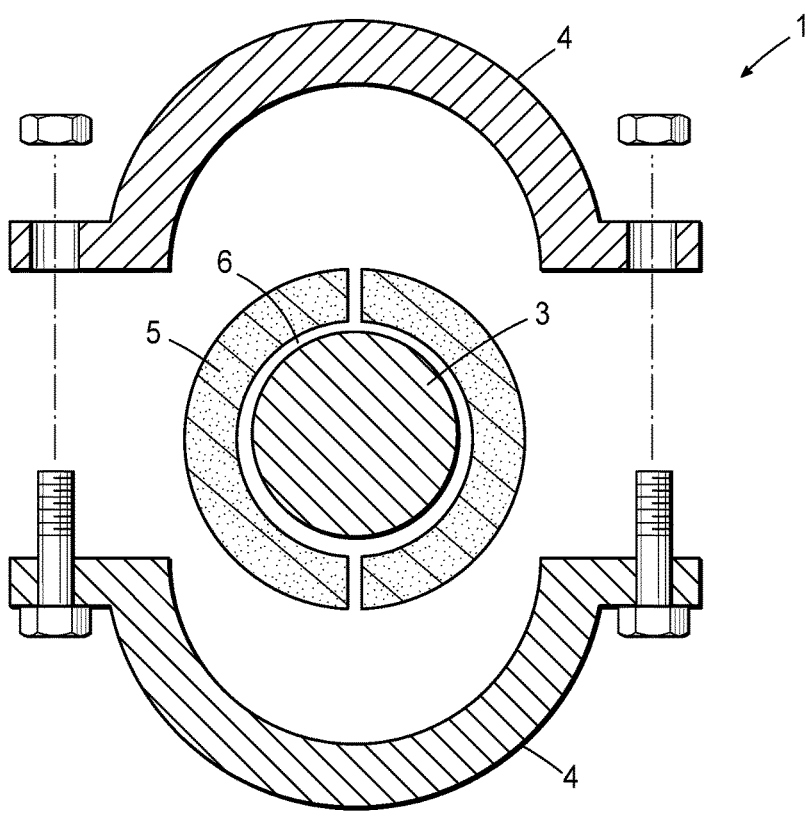

FIGS. 1c and 1d are cross sectional views of the sealing device 1 of FIGS. 1a and 1b, illustrating that the housing 4 comprises at least two detachable housing parts and the flexible plug part 5 comprises at least two detachable plug portions.

Figure 2A:
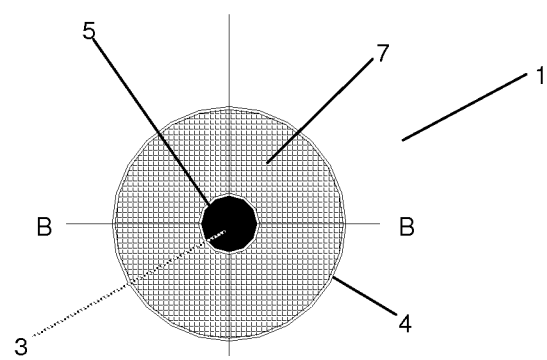
FIGS. 2a and 2b are cross sectional views of the sealing device of FIGS. 1a and 1b after grout material has been supplied.
Figure 2B:
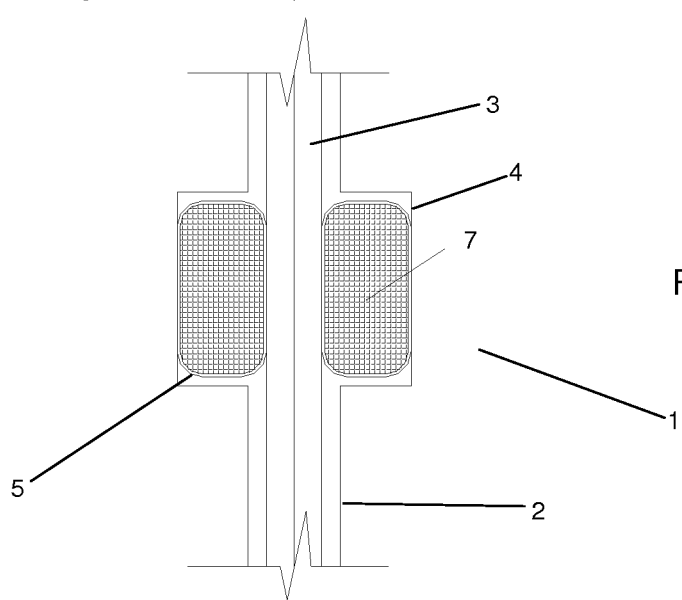

FIGS. 2a and 2b are cross sectional views of the sealing device 1 of FIGS. 1a and 1b, and illustrating this situation. FIG. 2a corresponds to FIG. 1a and FIG. 2b corresponds to FIG. 1b. Thus, in FIGS. 2a and 2b grout material 7 has been supplied to the flexible plug part 5, and this has caused the flexible plug part 5 to expand into the interior part of the tubing arrangement 2. It can be seen that the flexible plug part 5 abuts the cable 3, and that the passage shown in FIGS. 1a and 1b is no longer present. Once the grout material 7 has been allowed to cure, the flexible plug part 5 will stay in this position. Accordingly, it is not possible for water to pass the position of the sealing device 1, and a sealing effect has thereby been provided. Furthermore, the fact that the flexible plug part 5 abuts the cable 3 provides the possibility of using the sealing device 1 for reducing load caused by a freely hanging cable 3, thereby reducing wear on the cable 3 as well as on parts carrying the cable 3.

The invention claimed is:

1. A tubing arrangement, comprising:
a cable or an inner tube arranged in an interior part of the tubing arrangement,
a sealing device having a substantially rigid housing comprising at least two detachable housing parts, said housing having a continuous side wall and a pair of opposed annular end walls, said side wall and said pair of opposed annular end walls defining said housing as being substantially cylindrical, and said housing being mountable on or forming part of the tubing arrangement in such a manner that an interior part of said housing communicates with the tubing arrangement to define a substantially cylindrical enclosed space between an inner surface of said side wall of said housing and an outer surface of said cable or inner tube and between inner surfaces of said opposed annular end walls of said housing, and said sealing device further having a flexible plug part arranged in and contained within said space and having at least two detachable plug portions, said flexible plug part comprising an inlet opening, and
grout material supplied to said flexible plug part via said inlet opening, said flexible plug part adapted to expand within said space, thereby providing a first seal between said inner surface of said side wall of said housing and said flexible plug part for the length of said first seal, and a second seal between said flexible plug part and said outer surface of said cable or inner tube for the length of said second seal,
wherein said cable or inner tube is stationary relative to said flexible plug part, and
wherein said at least two detachable housing parts and said at least two detachable plug portions are detachable from each other in a manner that allows removal of said flexible plug part from said housing.

2. The tubing arrangement according to claim 1, wherein the tubing arrangement includes a J-tube.

3. A method of sealing a tubing arrangement having a cable or an inner tube arranged in an interior part thereof, comprising:
providing a sealing device having a substantially rigid housing having a continuous side wall and a pair of opposed annular end walls, said side wall and said pair of opposed annular end walls defining said housing as being substantially cylindrical, and said housing comprising at least two detachable housing parts and having an interior part that communicates with the tubing arrangement to define a substantially cylindrical enclosed space between an inner surface of said side wall of the housing and an outer surface of the cable or inner tube and between inner surfaces of said opposed annular end walls of said housing, and the sealing device further having a flexible plug part arranged in and contained within said space and having at least two detachable plug portions, the detachable housing parts and the detachable plug portions detachable from each other in a manner which allows removal of the flexible plug part,
mounting the sealing device on the tubing arrangement, and
supplying grout material to the flexible plug part of the sealing device such that the flexible plug part expands within the space to create a first seal between said inner surface of said side wall of said housing and the flexible plug part for the length of said first seal, and a second seal between the flexible plug part and the outer surface of the cable or inner tube for the length of said second seal, wherein said cable or inner tube is stationary relative to said flexible plug part.

4. The method according to claim 3, further comprising replacing the sealing device by another at least substantially identical sealing device.

5. The method according to claim 3, wherein a substantial time interval is allowed to lapse between performing the step of mounting the sealing device and performing the step of supplying grout material.

6. The tubing arrangement according to claim 1, wherein each of said at least two detachable housing parts extends in a circumferential direction for an amount less than a full circumference of the housing.

7. The tubing arrangement according to claim 1, wherein expansion of the flexible plug part due to the grout material causes a portion of the flexible material to engage the cable or inner tube.

8. The tubing arrangement according to claim 1, wherein the flexible plug part completely bounds the grout material.

9. A method of repairing or replacing a tubing arrangement including a cable or inner tube, the tubing arrangement further including a substantially rigid housing having a continuous side wall and a pair of opposed annular end walls, said side wall and said pair of opposed annular end walls defining said housing as being substantially cylindrical, and said housing comprising at least two detachable housing parts, the housing and the cable or inner tube defining a substantially cylindrical enclosed space between an inner surface of the side wall of the housing and an outer surface of the cable or inner tube and between inner surfaces of the opposed annular end walls of the housing, and the tubing arrangement further including a flexible plug part arranged in and contained within the space and having at least two detachable plug portions, the method comprising:
detaching at least two housing parts of the housing of the tubing arrangement;
removing at least one of the at least two housing parts from the tubing arrangement;
detaching at least two plug portions of the flexible plug part;
removing the flexible plug part from the housing;
inserting another flexible plug part into the housing, the another flexible plug part having at least two plug portions;

replacing the at least one of the at least two housing parts previously removed from the housing; and filling the another flexible plug part with grout material to create a first seal between the inner surface of said side wall of the housing and the flexible plug part for the length of the first seal, and a second seal between the flexible plug part and the outer surface of the cable or inner tube for the length of the second seal;

wherein said cable or inner tube is stationary relative to said flexible plug part.

10. The method according to claim 9, further comprising:

removing the cable or inner tube from the tubing arrangement; and inserting another cable or inner tube in the tubing arrangement.

11. The tubing arrangement of claim 1 wherein said cable or inner tube is oriented substantially vertically and said flexible plug part at least partially supports the weight of said cable or inner tube along the length of said flexible plug part thereby reducing wear on said cable or inner tube as well as on parts carrying said cable or inner tube that would otherwise occur due to loads caused by a freely hanging said cable or inner tube.

12. The method of claim 3 wherein said cable or inner tube is oriented substantially vertically and said flexible plug part at least partially supports the weight of said cable or inner tube along the length of said flexible plug part thereby reducing wear on said cable or inner tube as well as on parts carrying said cable or inner tube that would otherwise occur due to loads caused by a freely hanging said cable or inner tube.

13. The method of claim 9 wherein said cable or inner tube is oriented substantially vertically and said flexible plug part at least partially supports the weight of said cable or inner tube along the length of said flexible plug part thereby reducing wear on said cable or inner tube as well as on parts carrying said cable or inner tube that would otherwise occur due to loads caused by a freely hanging said cable or inner tube.

14. The tubing arrangement according to claim 1, wherein the tubing arrangement is adapted to be applied in an offshore facility.

* * * * *